United States Patent Office 2,764,452
Patented Sept. 25, 1956

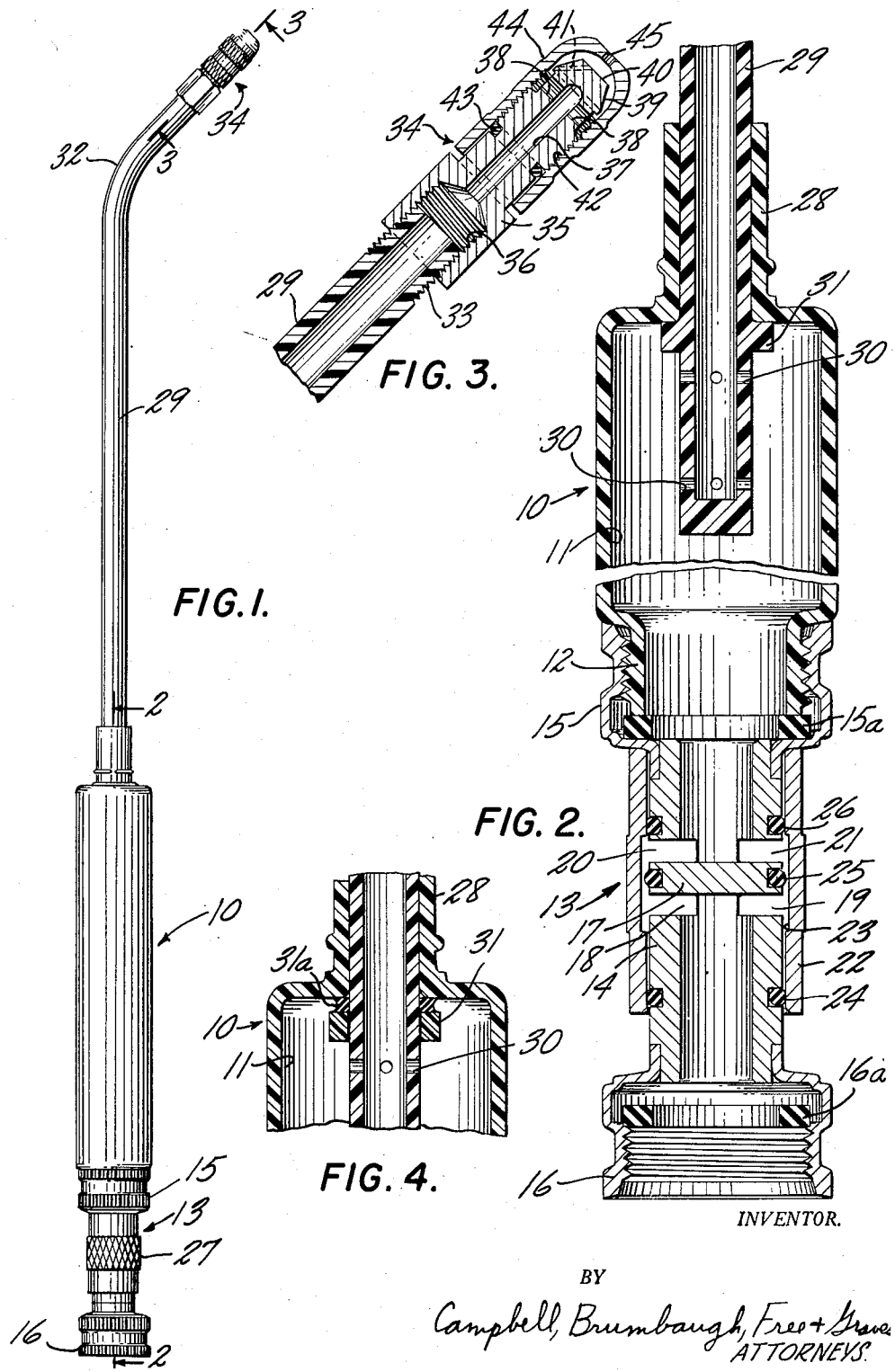

2,764,452

SPRAYER

Denton Anderson, Redding, and Francis H. Snyder, Newtown, Conn.

Application June 28, 1954, Serial No. 439,732

3 Claims. (Cl. 299—83)

This invention relates to a sprayer and, more particularly, pertains to an attachment adapted to receive and mix soluble pellets with a source of water for spraying a solution thereof.

In certain instances such as home gardening, the need arises for a small portable sprayer for depositing, for example, insecticide or fertilizer on plants. Apparatus utilized for this purpose in the past has been subject to the disadvantages of bulkiness, complexity, cleansing problems and a propensity for becoming clogged. In the latter instance, it was difficult to determine and remedy the stopped up condition without the time consuming operation of disassembling and cleaning the entire apparatus. Accordingly, it is an object of the present invention to provide a light, portable, simplified sprayer overcoming the deficiencies of prior spraying apparatus.

It is another object of the present invention to provide a sprayer of the above character formed from a plastic that is at least partially transparent to permit viewing the passage of water therethrough.

It is yet another object of the invention to provide a portable sprayer attachment which may be easily loaded and cleaned.

It is still another object of the invention to provide a sprayer of the above character having a spraying tube that is self-sealing to a mixing chamber.

It is a further object of the present invention to provide a sprayer of the above character in which the tube extending into the mixing chamber is provided with non-clogging filter means to prevent obstruction of the spraying nozzle.

These and further objects of the present invention are accomplished by providing a plastic casing adapted to receive a valve attachment on one end leading to a source of water under pressure and a tube extending from the other end carrying a spraying nozzle. On the end of the tube within the casing is formed a collar which aids in sealing the tube thereto and behind the collar is provided a non-clogging filter for the solution that is sprayed through the nozzle.

In order to provide the spraying solution, small pellets are introduced into the casing by removing the valve attachment. The pellets preferably contain a water soluble dye to indicate their depletion. The water flowing into the casing through the valve attachment dissolves the pellets and the resulting solution is forced through the filter and the stem to the spraying nozzle.

These and further objects and advantages of the invention will be more readily understood when the following description is read in connection with the accompanying drawings in which:

Figure 1 is an elevation of a sprayer constructed in accordance with the present invention;

Figure 2 is a longitudinal section, greatly enlarged, of the sprayer of Figure 1 taken on the view line 2—2 looking in the direction of the arrows;

Figure 3 is a longitudinal section, greatly enlarged, of a spraying nozzle employed in the sprayer taken on the view line 3—3 in Figure 1 looking in the direction of the arrows; and Figure 4 is a sectional view of a detail of Figure 2 illustrating a modified form of the invention.

Referring to an illustrative embodiment of the invention in greater detail with reference to the drawings, a generally cylindrical casing 10 defines a mixing chamber 11 and is formed from a tough, light plastic that is at least partially transparent such as polyethylene. An integral exteriorly threaded cylindrical extension 12 is found on one end of the casing 10 and removably carries a connector valve 13.

Examining the valve in detail, a tubular valve body 14 carries force-fitted interiorly threaded couplings 15 and 16 on both ends thereof, the coupling 15 mounting a gasket 15a and cooperating with the threads on the extension 12 and the coupling 16 mounting a gasket 16a and adapted to be screw connected to a source of water pressure such as a hose. A partition 17 interrupts the water flow through the valve 13 and openings 18, 19 and 21, 22 on both sides thereof communicating with the interior of the valve body 14 on both sides of the partition 17. A slidable sleeve 22 formed with an interior annular recessed portion 23 encircles the valve body 14 and bears on resilient rings 24, 25 and 26 mounted in annular grooves in the body 14. A knurled ring 27 is also found on the outer surface of the sleeve 22.

It is apparent from Figure 2 that in the upper illustrated position of the sleeve 22, water will flow through the lower end of the valve body 14, the openings 18 and 19, the openings 20 and 21 and the upper end of the valve body 14 to the chamber 11. However, if the sleeve is grasped and moved downwardly, the knurled portion 27 facilitating this function, the shoulder formed at the upper side of the recessed portion 23 will engage the resilient ring 25 to preclude the further flow of water to the openings 20 and 21.

On the other end of the casing 10 is formed an integral cylindrical neck 28. It will be understood that the entire casing 10 including the extension 12 and the neck 28 may be a single molded piece of plastic material. Closely fitting the neck 28 is a preferably transparent tube 29 formed from a plastic such as methyl methacrylate. The end of the tube 29 within the chamber 11 is enclosed and has formed therein a plurality of small transverse filter openings 30. The size of the openings 30 is determined by the pellets employed in the chamber 10 and the spraying nozzle, described hereinafter, employed in the sprayer. Thus, the openings 30 should preclude the passage of particles therethrough that would not pass through the nozzle, keeping in mind that some reduction of the particle by dissolution will occur in their transit through the tube 29 to the nozzle.

A collar 31 is provided immediately forward of the filter openings 30 on the tube 29. The collar 31 may be formed integrally with the tube 29 as illustrated in Figure 2 or may comprise a separate ring fastened by a suitable adhesive to the tube 29 as shown in Figure 4. In this embodiment of the invention, the tube 29 is drawn through the neck 28 until the collar 31 abuts the transverse end wall of the casing 10. It will be evident that this arrangement effectively seals the casing 10 and the tube 29 to prevent leakage of solution therebetween. In fact, as the water pressure within the chamber 11 increases, the collar 31 will be urged with a proportionally greater force against the end wall of the casing 10 to more effectively seal the sprayer against leakage.

Referring to Figure 4, a resilient ring gasket 31a may be positioned on the tube 29 between the collar 31 and the end wall of the casing 10. This will prevent leakage between the tube 29 and the casing 10 in the event these elements are not tightly fitted together.

The end of the tubing 29 is preferably slightly bent at the point 32 to facilitate the handling of the sprayer when in operation. Obviously, if the collar 31 is formed integrally with the tube 29, the bend 32 must be made after the tube 31 has been inserted through the neck 28. It should be noted that the length of the tube 29 between the collar 31 and the bend 32 is greater than the entire length of the casing 10. This arrangement permits the tube 29 to be pushed through the casing 10, after removal of the valve 13, so that the filter openings 30 extend out of the chamber 10. In this position, the filter may be quickly and easily cleaned.

Referring to Figure 3, threads 33 are formed on the end of the tube 29 remote from the casing 10 and receive a threaded spraying nozzle 34. Examining the nozzle 34 in detail, a core 35 is formed with a threaded cylindrical recess 36 on one end thereof communicating through a passage 37 with a pair of openings 38 on the other end thereof. A head 39 on the core 35 extends transversely beyond the openings 38 and tapers to a smaller circular surface 40. A pair of oppositely disposed oblique curved slots 41 are formed in the tapered head 39. The core 35 also carries threads 42 and a resilient sealing ring 43.

An interiorly threaded cup-like nose 44 formed with an opening 45 in the forward end thereof screws on the core 35 and is sealed thereto by the ring 43. The operation of the nozzle 34 is apparent from Figure 3, the spray being adjustable from a mist to a stream by rotation of the nose 44 on the core 35.

In utilizing the sprayer, the connector valve 13 is removed from the extension 12 and the chamber 11 filled with pellets (not shown) preferably the size of a pea. The amount and nature of the pellets will, of course, be determined by the solution desired. Thus, if it is desired to provide an insecticide solution, suitable pellets which when dissolved in water form an insecticide solution are introduced into the casing 10. It should be noted that any of the pellets utilized may carry a water soluble dye to clearly indicate through the casing the concentration of the solution being formed and the number and size of the undissolved pellets.

The connector valve 13 is then attached to a water supply hose. The sleeve 22 may next be moved to permit water to flow into the chamber 11. The axial operation of the valve 13 is not only simple but also precludes any twisting which would tend to loosen the connections between the water source and the sprayer.

It is preferable to employ only transverse openings 30 in the tube 29 so that the closed end will act as a baffle to aid in preventing the water from flowing directly through the casing 10 and the tubing 29 without absorbing sufficient quantities of the material forming the pellets within the chamber 11.

The solution found in the chamber 10 will be under a somewhat lower pressure than the source water due to the restricted passage through the valve 13 and the outlet through the filter openings 30 to the tube 29. Further, the water entering the chamber 11 will tend to swirl through the pellets therein due to the cylindrical configuration of the chamber 11 and the lack of a direct flow path therethrough. The swirling action of the water will dissolve and take into solution substantial quantities of the material forming the pellets and the resulting solution will continue on through the filter openings 30, the tube 29 to the nozzle 34, which may be adjusted to provide any desired type of spray. As the spraying operation continues, the operator may check the contents of the casing 10 to determine when the pellets therein are sufficiently depleted to require the introduction of a new charge.

It will be understood that the above-described embodiments of the invention are illustrative only and modifications thereof will occur to those skilled in the art. For example, the casing and tubing are not limited to any specific plastic, but are preferably formed from plastics having the properties of being at least partially transparent so that the flow of solution therethrough may be monitored by the operator of the sprayer. Therefor, the invention is not to be limited to the specific apparatus disclosed herein but is to be defined by the appended claims.

We claim:

1. A sprayer comprising a cylindrical mixing chamber, a removable connector valve on one end adapted to be connected to a source of water, the valve being operable by an element slidable axially with respect to the chamber, a hollow cylindrical neck having a smoothly surfaced interior wall extending from the other end of the chamber, a tube slidably mounted in the neck and carrying an adjustable spraying nozzle on the end thereof remote from the chamber, the exterior surface of the tube normally engaging the neck and a substantial adjacent surface portion exterior of the chamber being smoothly surfaced, the tube extending from the neck towards the nozzle including a straight portion therebetween greater in length than the length of the chamber, a collar on the tube abutting the interior surface of the end wall of the chamber adjacent to the neck, a portion of the tube extending beyond the collar into the chamber and being plugged at the end thereof, and a plurality of small transverse openings in the wall of the extending portion of the tube communicating with the interior of the tube.

2. A sprayer comprising a cylindrical mixing chamber, a removable connector valve on one end adapted to be connected to a source of water, the valve being operable by an element slidable axially with respect to the chamber, a hollow cylindrical neck having a smoothly surfaced interior wall extending from the other end of the chamber, a tube slidably mounted in the neck and carrying an adjustable spraying nozzle on the end thereof remote from the chamber, the exterior surface of the tube normally engaging the neck and a substantial adjacent surface portion exterior of the chamber being smoothly surfaced, the tube extending from the neck towards the nozzle including a straight portion therebetween greater in length than the length of the chamber, a collar on the tube adjacent to the interior surface of the end wall of the chamber at the neck, a resilient ring gasket mounted on the tube between the collar and the end wall, a portion of the tube extending beyond the collar into the chamber and being plugged at the end thereof, and a plurality of small transverse openings in the wall of the extending portion of the tube communicating with the interior of the tube.

3. A sprayer comprising a cylindrical mixing chamber, a removable connector valve on one end adapted to be joined to a source of water, a hollow cylindrical neck having a smoothly surfaced interior wall extending from the other end of the chamber, a tube slidably mounted in the neck and carrying a spraying nozzle on the end thereof remote from the chamber, the exterior surface of the tube normally engaging the neck and a substantial adjacent surface portion exterior of the chamber being smoothly surfaced, the tube extending from the neck towards the nozzle including a straight portion therebetween greater in length than the length of the chamber, a collar on the tube adjacent to the interior surface of the end wall of the chamber at the neck, and a filter formed by a plurality of small transverse openings in the wall of the end of the tube in the chamber.

References Cited in the file of this patent

UNITED STATES PATENTS

| | | |
|---|---|---|
| 432,870 | Gralike | July 27, 1890 |
| 916,340 | Lewis | Mar. 23, 1909 |
| 2,210,676 | Krannak | Aug. 6, 1940 |
| 2,218,790 | Gifford | Oct. 22, 1940 |
| 2,409,734 | Bucker | Oct. 22, 1946 |